(12) United States Patent
Han et al.

(10) Patent No.: US 9,460,368 B2
(45) Date of Patent: Oct. 4, 2016

(54) METHOD OF LEARNING A PARAMETER TO ESTIMATE POSTURE OF AN ARTICULATED OBJECT AND METHOD OF ESTIMATING POSTURE OF AN ARTICULATED OBJECT

(71) Applicant: Samsung Electronics Co., Ltd., Suwon-Si, Gyeonggi-Do (KR)

(72) Inventors: Seung Ju Han, Seoul (KR); Jae Joon Han, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/523,101

(22) Filed: Oct. 24, 2014

(65) Prior Publication Data

US 2015/0206032 A1 Jul. 23, 2015

(30) Foreign Application Priority Data

Jan. 23, 2014 (KR) .................. 10-2014-0008530

(51) Int. Cl.
*G06K 9/62* (2006.01)
*G06K 9/68* (2006.01)
*G06K 9/00* (2006.01)

(52) U.S. Cl.
CPC ......... *G06K 9/6878* (2013.01); *G06K 9/00375* (2013.01)

(58) Field of Classification Search
USPC .............. 382/154, 156, 157, 160, 224, 278; 358/537, 452
See application file for complete search history.

(56) References Cited

U.S. PATENT DOCUMENTS

| | | | | |
|---|---|---|---|---|
| 5,724,493 A * | 3/1998 | Hosoya | ................... | G06T 17/00 345/423 |
| 7,149,665 B2 * | 12/2006 | Feld | ................... | A41H 3/007 345/420 |
| 7,336,814 B2 * | 2/2008 | Boca | ................... | G06K 9/32 382/141 |
| 7,663,689 B2 * | 2/2010 | Marks | ................... | H04N 5/272 348/370 |
| 8,238,642 B2 * | 8/2012 | Wu | ................... | G01B 11/02 382/141 |
| 8,295,643 B2 * | 10/2012 | Yamaguchi | ........ | G06K 9/00791 382/106 |
| 8,401,248 B1 * | 3/2013 | Moon | ................ | G06Q 30/0242 382/103 |
| 8,411,149 B2 * | 4/2013 | Maison | .............. | G06K 9/00369 348/207.1 |
| 8,416,189 B2 * | 4/2013 | Lou | ................... | G06F 3/017 345/158 |
| 8,582,867 B2 * | 11/2013 | Litvak | ................ | G06K 9/00201 382/154 |

FOREIGN PATENT DOCUMENTS

| | | |
|---|---|---|
| KR | 20050060606 A | 6/2005 |
| KR | 10-0722229 B1 | 5/2007 |
| KR | 10-1307984 B1 | 9/2013 |

OTHER PUBLICATIONS

A. Hernândez-Vela, "Graph Cuts Optirnization for Multi-Limb Human Segmentation in Depth Maps", 2012 IEEE Conference, 7 pgs.

(Continued)

*Primary Examiner* — Yosef Kassa
(74) *Attorney, Agent, or Firm* — Harness, Dickey & Pierce, P.L.C.

(57) ABSTRACT

A method of learning a parameter to estimate a posture of an articulated object, and a method of estimating the posture of the articulated object are provided. A parameter used to estimate a posture of an articulated object may be iteratively learned based on a depth feature corresponding to an iteration count, and the posture of the articulated object may be estimated based on the learned parameter.

18 Claims, 12 Drawing Sheets

(56) References Cited

OTHER PUBLICATIONS

X. Xiong, "Supervised Descent Method and its Applications to Face Alignment", Jun. 23-28, 2013 , 8pgsThe Robotics Institute, Carnegie Mellon University, Pittsburgh PA.

G. Rafiee, "Automatic Segmentation of Interest Regions in Low Depth of Field Images Using Ensemble Clustering and Graph Cut Optimization Approaches", 2012 IEEE International Symposium on Multimedia, 4pgs, Newcastle upon Tyne, United Kingdom.

K. Fukuda, "Automatic Segmentation of Object Region Using Graph Cuts Based on Saliency Maps and AdaBoost",The 13th IEEE International Symposium on Consumer Electronics, SCE2009, 2pgs, Japan.

S. Zhou, "An Intelligent Gradient Method and Its Application to Parameter Identification of Dynamical Linear Processes", Proceedings of the 3rd World Congress on Intelligent Control and Automation Jun. 28-Jul. 2, 2000, Hefei, P.R. China, 6pgs.

T.F. Cootes,"Active appearance models", This paper appears in Proc. European Conference on Computer Vision 1998, 16pgs, Manchester, UK.

* cited by examiner

FIG. 5

| | First training image 511 | ... | i-th training image 512 | ... | 513 Learning of $R_1, b_1$ |
|---|---|---|---|---|---|
| First iteration 510 | $(x^1_* - x^1_1) - R_1 \cdot \varnothing^1_1 - b_1$ | ... | $(x^i_* - x^i_1) - R_1 \cdot \varnothing^i_1 - b_1$ | ... | |
| 521 | ... | ... | 522 | ... | 523 |
| ⋮ 520 | ⋮ | ... | ⋮ | ... | Learning of $R_k, b_k$ |
| k-th iteration | $(x^1_* - x^1_k) - R_k \cdot \varnothing^1_k - b_k$ | ... | $(x^i_* - x^i_k) - R_k \cdot \varnothing^i_k - b_k$ | ... | |

FIG. 8
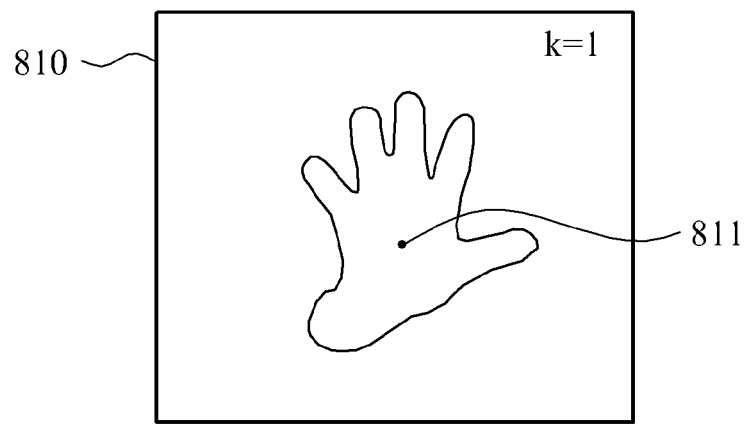
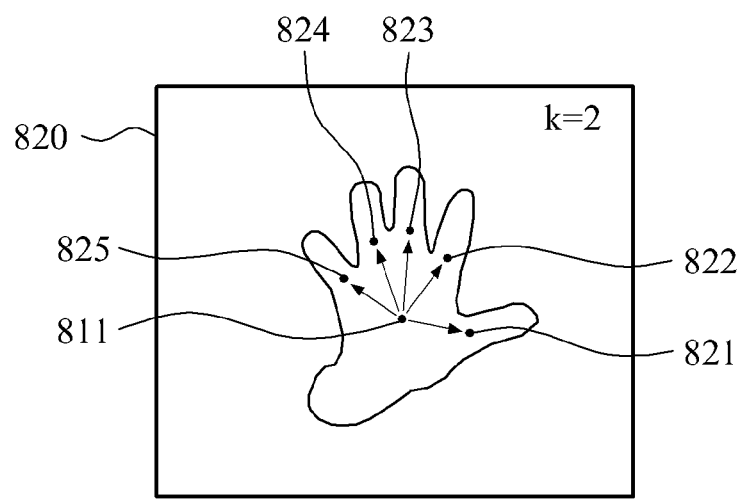
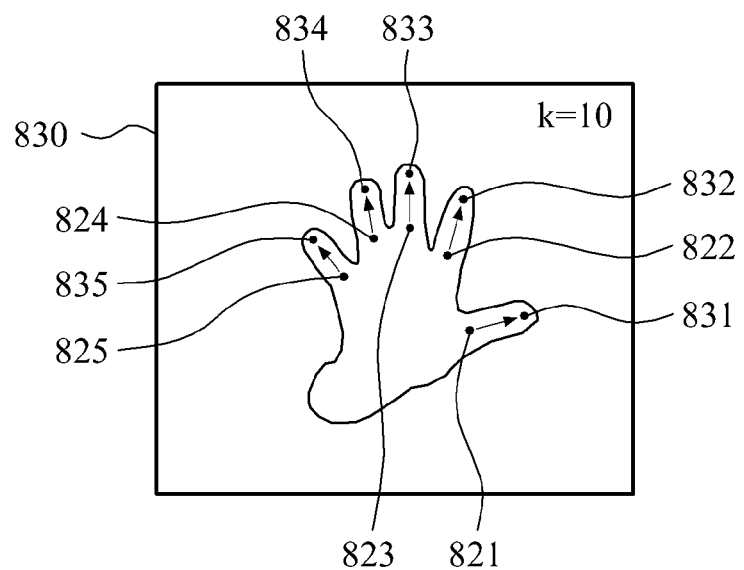

METHOD OF LEARNING A PARAMETER TO ESTIMATE POSTURE OF AN ARTICULATED OBJECT AND METHOD OF ESTIMATING POSTURE OF AN ARTICULATED OBJECT

CROSS-REFERENCE TO RELATED APPLICATION

This application claims the priority benefit of Korean Patent Application No. 10-2014-0008530, filed on Jan. 23, 2014, in the Korean Intellectual Property Office, the entire contents of which are incorporated herein by reference.

BACKGROUND

1. Field

Example embodiments relate to a method of learning a parameter to estimate a posture of an articulated object, and a method of estimating the posture of the articulated object.

2. Description of the Related Art

Interest in technology for estimating a posture of a target object in a three-dimensional (3D) space is increasing. The technology may be applied to, for example, a video game, a virtual world, a movie, computer graphics, and the like.

A depth image may refer to an image storing depth information indicating a depth from a depth image camera to a target object.

SUMMARY

Some example embodiments relate to a learning method.

In some example embodiments, the learning method includes iteratively learning a parameter based on an estimation position and a depth feature corresponding to the estimation position, the learned parameter being a parameter used to estimate a posture of an articulated object in a training image and the estimation position corresponding to an iteration count. In some example embodiments, the training image may include position information of parts of the articulated object.

In some example embodiments, the iteratively learning of a parameter may include computing the depth feature based on the estimation position, and computing the parameter based on the position information, the estimation position, and the depth feature.

In some example embodiments, the iteratively learning of a parameter may include computing the estimation position based on an estimation position, a depth feature, and a parameter corresponding to a previous iteration count.

In some example embodiments, the iteratively learning of a parameter may include generating a plurality of offset pairs within an area around the estimation position, and the depth feature may be computed based on the offset pairs. In some example embodiments as the iteration count increases, a size of the area may decrease.

Some example embodiments relate to an estimation method.

In some example embodiments, the estimation method includes iteratively estimating position information of parts of an articulated object included in an input image based on an estimation position corresponding to an iteration count, a depth feature corresponding to the estimation position, and a parameter corresponding to the iteration count.

In some example embodiments, the iteratively estimating position information may include computing the estimation position based on an estimation position, a depth feature, and a parameter associated with a previous iteration count.

In some example embodiments, the iteratively estimating position information may include computing the depth feature based on offset pairs, the offset pairs indicating offset positions that are based on the estimation position. The offset positions may be set to be distributed closer to the estimation position, as the iteration count increases.

Some example embodiments relate to a learning apparatus.

In some example embodiments, the learning apparatus may include a receiver to receive a training image including an articulated object, and a learner to iteratively learn a parameter used to estimate a posture of the articulated object, based on an estimation position corresponding to an iteration count and a depth feature corresponding to the estimation position.

Some example embodiments relate to an estimation apparatus.

In some example embodiments, the estimation apparatus may include a receiver to receive an input image including an articulated object, a computing unit to iteratively compute position information of parts of the articulated object based on an estimation position corresponding to an iteration count, a depth feature corresponding to the estimation position, and a parameter that is learned in advance corresponding to the iteration count, and an estimator to estimate a posture of the articulated object based on the position information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 5 illustrates a diagram of an operation of learning a parameter corresponding to an iteration count according to example embodiments;

FIG. 8 illustrates a diagram of an operation of iteratively estimating position information of parts of an articulated object according to example embodiments;

DETAILED DESCRIPTION

Figure 1:
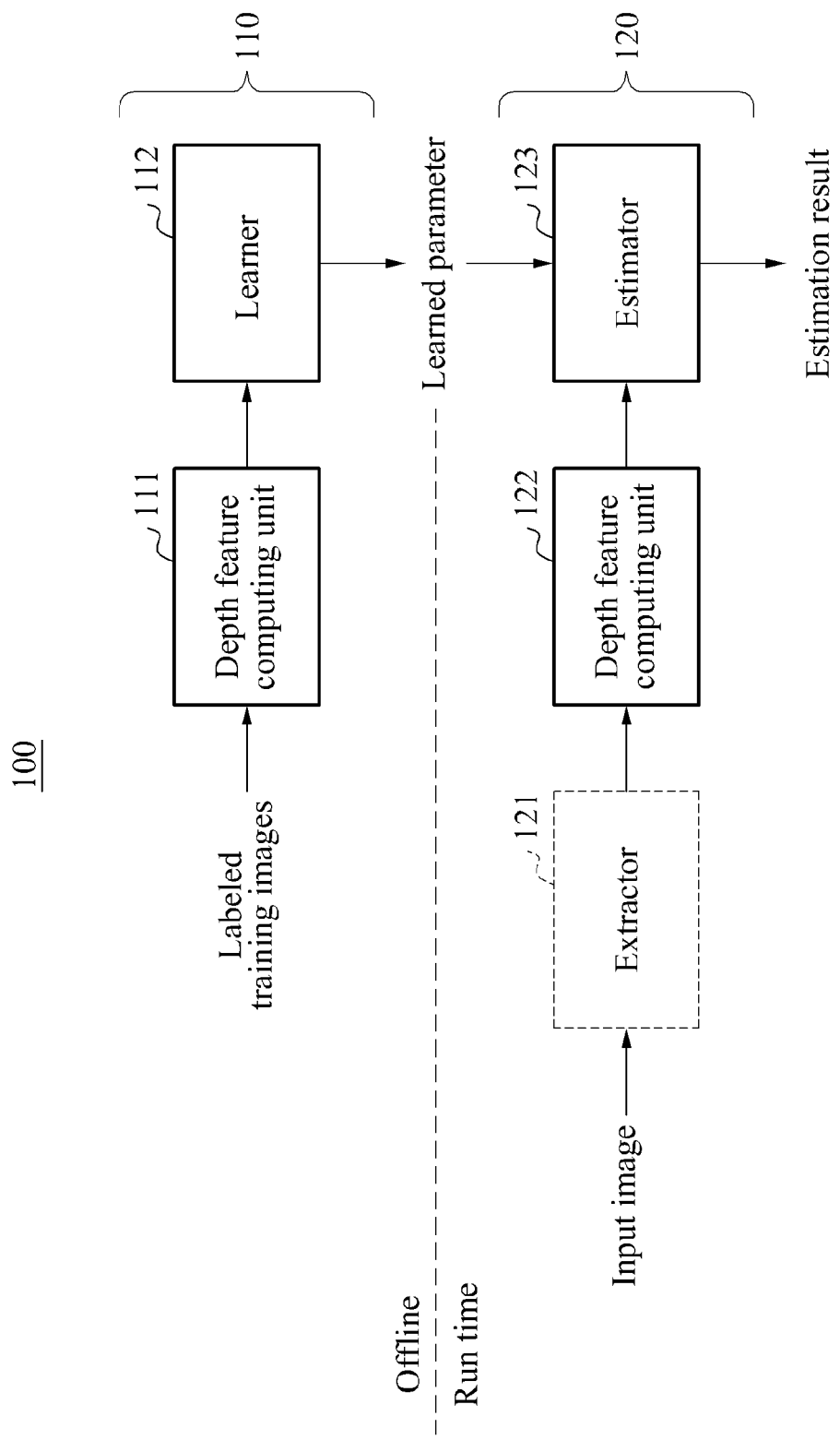
FIG. 1 illustrates a diagram of a system for estimating a posture of an articulated object according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates a diagram of a system for estimating a posture of an articulated object according to example embodiments.

Referring to FIG. 1, a system 100 may include a learning apparatus 110, and an estimation apparatus 120. The learning apparatus 110 may learn, in an offline state, a parameter used to estimate a posture of an articulated object. The estimation apparatus 120 may estimate, in a run time, the posture of the articulated object using the parameter learned by the learning apparatus 110.

The learning apparatus 110 may include a depth feature computing unit 111, and a learner 112.

The depth feature computing unit 111 may receive labeled training images. Each of the labeled training images may be a depth image, and may include position information of parts of the articulated object. For example, a labeled training image may be a depth image corresponding to a human hand. In this example, the labeled training image may include position information associated with a center of a palm and knuckles of the human hand.

The depth feature computing unit 111 may compute a depth feature from the labeled training images. The depth feature may include vectors indicating depth values of a depth image, and may be referred to as a "depth comparison feature."

The learner 112 may generate a parameter learned based on the depth feature. The learned parameter may be used to estimate the posture of the articulated object during run time. The depth feature and the learned parameter will be further described below.

The learning apparatus 110 may compute a depth feature and learn a parameter through a plurality of iterations. For example, in a first iteration, the depth feature computing unit 111 may compute a first depth feature from labeled training images, and the learner 112 may generate a first parameter learned based on the first depth feature. In a second iteration, the depth feature computing unit 111 may compute a second depth feature based on the first parameter learned in the first iteration, and the learner 112 may generate a second parameter learned based on the second depth feature. When the plurality of iterations are completed, the learner 112 may output parameters learned through the plurality of iterations. The learned parameters may be stored in a storage space that is provided in advance.

The estimation apparatus 120 may include a depth feature computing unit 122, and an estimator 123. In one or more example embodiments, the estimation apparatus 120 may further include an extractor 121.

The estimation apparatus 120 may receive an input image. The input image may be a depth image, for example, a depth image corresponding to an articulated object.

When the input image includes information regarding aspects other than an area of the articulated object, the extractor 121 may extract an area of the articulated object from the input image. For example, when a posture of a hand of a human is to be estimated, and when a depth image representing an arm, a trunk, and the like of the human in addition to the hand is received, the extractor 121 may extract an area corresponding to the hand from the received depth image. Hereinafter, the input image may refer to a received image, or an extracted input image.

The depth feature computing unit 122 may compute a depth feature from the input image. The depth feature computing unit 122 of the estimation apparatus 120 may compute the depth feature, using substantially the same method as that used by the depth feature computing unit 111 of the learning apparatus 110. For example, the depth feature computing unit 122 may use information generated to compute the depth feature in the depth feature computing unit 111. The depth feature computing unit 122 may compute the depth feature based on the information generated in the depth feature computing unit 111. However, the depth feature computing unit 122 may compute the depth feature based on the input image, instead of based on training images, and accordingly the depth feature computed by the depth feature computing unit 122 may have a different value from the depth feature computed by the depth feature computing unit 111.

The estimator 123 may estimate the posture of the articulated object in the input image, based on the parameter learned in the offline state (e.g. in advance) by the learning apparatus 110 and based on the depth feature computed by the depth feature computing unit 122. As such, the estimator 123 may generate an estimation result which estimates position information of parts of the articulated object in the input image.

The estimation apparatus 120 may compute a depth feature and estimate a posture of an articulated object, through a plurality of iterations. For example, in a first iteration, the depth feature computing unit 122 may compute a first depth feature from an input image, and the estimator 123 may estimate first position information of parts of an articulated object in the input image, based on the first depth feature and a learned parameter corresponding to the first iteration. In a second iteration, the depth feature computing unit 122 may compute a second depth feature based on the first position information estimated in the first iteration, and the estimator 123 may estimate second position information of the parts of the articulated object, based on the second depth feature and a learned parameter corresponding to the second iteration. When the plurality of iterations are completed, the estimator 123 may output final position information of the parts of the articulated object.

According to example embodiments, in a user interface system utilizing a hand posture, accurate estimation of the hand posture may have affect a user's sense of immersion in the system and a function of the system. For example, example embodiments may be applied to an augmented reality system to connect a virtual object and an actual object using a hand where an accuracy of the estimation of the posture of the hand is increased.

Hereinafter, an operation of each of the learning apparatus 110 and the estimation apparatus 120 will be further described with reference to FIGS. 2 through 10.

Figure 2:
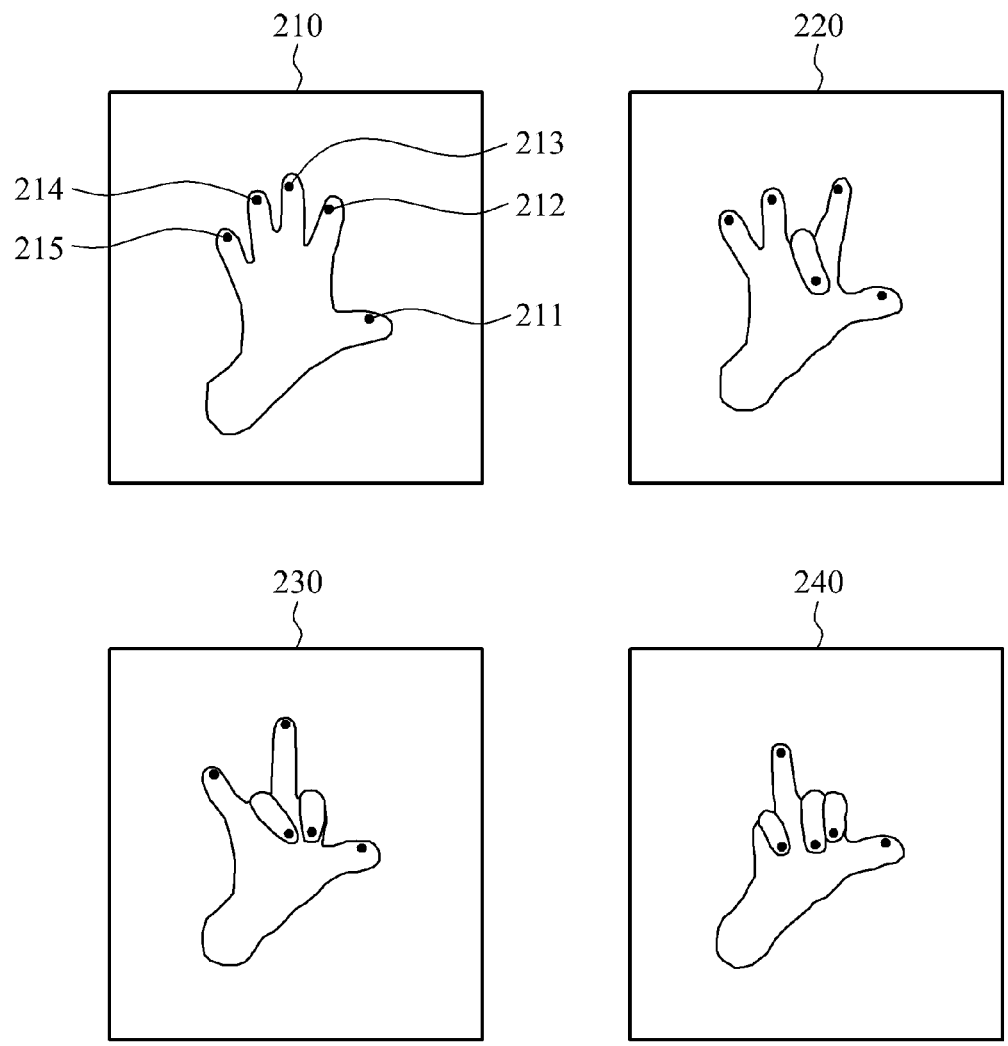
FIG. 2 illustrates a diagram of labeled training images according to example embodiments.

FIG. 2 illustrates a diagram of labeled training images according to example embodiments.

Referring to FIG. 2, labeled training images 210, 220, 230, and 240 may correspond to articulated objects with different postures. The articulated objects may be objects that include joints. In the following description, for convenience of description, an articulated object may be assumed to be a hand of a human. The labeled training images 210 through 240 may be, for example, depth images corresponding to human hands. The labeled training images 210 through 240 may correspond to different hand postures.

As described above, each of the labeled training images 210 through 240 may include position information of parts of an articulated object. For example, the labeled training image 210 may include position information of a thumb's first knuckle 211, position information of an index finger's first knuckle 212, position information of a middle finger's first knuckle 213, position information of a ring finger's first knuckle 214, and position information of a little finger's first knuckle 215. Each of the labeled training images 210 through 240 may further include position information of additional parts of an articulated object. For example, each of the labeled training images 210 through 240 may include position information associated with a center of a palm and other knuckles of a human hand.

The position information may be represented by three-dimensional (3D) coordinates, for example, an x-coordinate, a y-coordinate, and a z-coordinate. A depth image may have a depth value corresponding to a pixel with an x-coordinate and a y-coordinate such that the position information may be represented by two-dimensional (2D) coordinates, for example, an x-coordinate and a y-coordinate, therefore, a z-coordinate may be derived from the depth value corresponding to the pixel.

Figure 3:
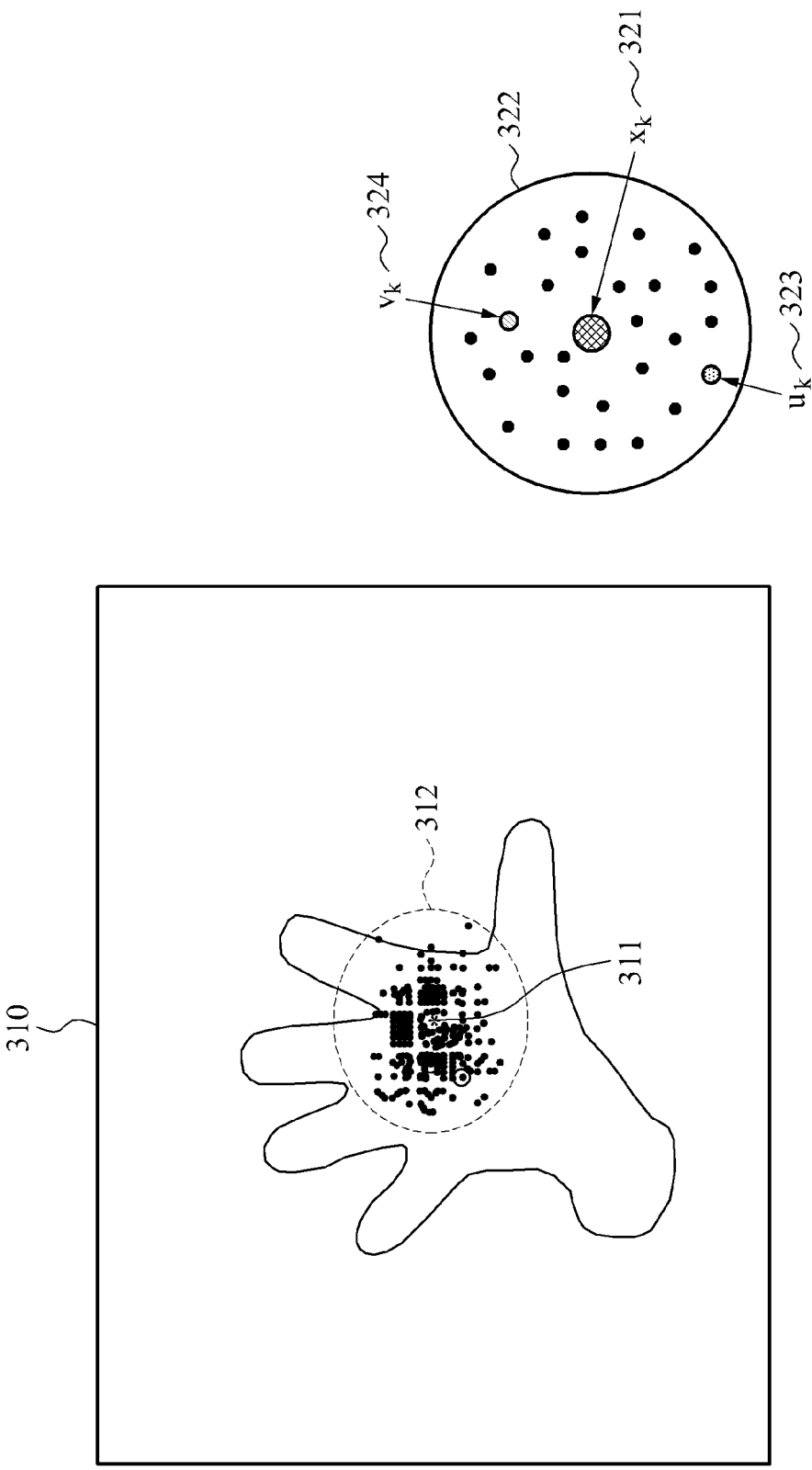
FIG. 3 illustrates a diagram of offset pairs used to compute a depth feature according to example embodiments.

FIG. 3 illustrates a diagram of offset pairs used to compute a depth feature according to example embodiments.

Referring to FIG. 3, the depth feature computing unit 111 may generate a plurality of points 312 around a point 311 in a training image 310, to compute a depth feature for the point 311. The depth feature computing unit 111 may pair of the generated points 312. For example, the depth feature computing unit 111 may generate two hundred (200) points within a desired (or alternatively, a predetermined) area around the point 311, and may generate one hundred (100) pairs, known herein as offset pairs, by pairing the 200 points.

A plurality of offset pairs generated by the depth feature computing unit 111 may be used to compute a depth feature. For example, a depth feature may be computed by Equation 1 below.

$$\phi_k(x_k) = d\left(x_k + \frac{u_k}{d(x_k)}\right) - d\left(x_k + \frac{v_k}{d(x_k)}\right) \quad \text{[Equation 1]}$$

In Equation 1, k denotes an iteration count, $x_k$ denotes an estimation position corresponding to a k-th iteration, $u_k$ and $v_k$ denote points of an offset pair corresponding to the k-th iteration, d( ) denotes an operator to compute a depth, and $\phi_k$( ) denotes an operator to compute a depth feature corresponding to the k-th iteration. The iteration count k may refer to a parameter indicating a k-th iteration.

As described above, the learning apparatus 110 of FIG. 1 may compute a depth feature and may learn a parameter, through a plurality of iterations. An estimation position corresponding to an iteration count may be updated every iteration. For example, an estimation position $x_1$ corresponding to a first iteration may be set as an initial value. The initial value may indicate, for example, a center of an object included in a training image. The estimation position may move from the initial value towards an actual position of a desired (or alternatively, a predetermined) part of an articulated object in each iteration.

In the k-th iteration, the depth feature computing unit 111 may generate a plurality of points within a desired (or alternatively, a predetermined) area 322 around an estimation position $x_k$ 321 corresponding to the k-th iteration. The depth feature computing unit 111 may form a pair of points $u_k$ 323 and $v_k$ 324 among the generated points. Because each of the points $u_k$ 323 and $v_k$ 324 includes an offset position originated from the estimation position $x_k$ 321, the pair of the points $u_k$ 323 and $v_k$ 324 may be referred to as an offset pair corresponding to the k-th iteration. The depth feature computing unit 111 may generate a plurality of offset pairs within the desired area 322 around the estimation position $x_k$ 321.

Figure 4:
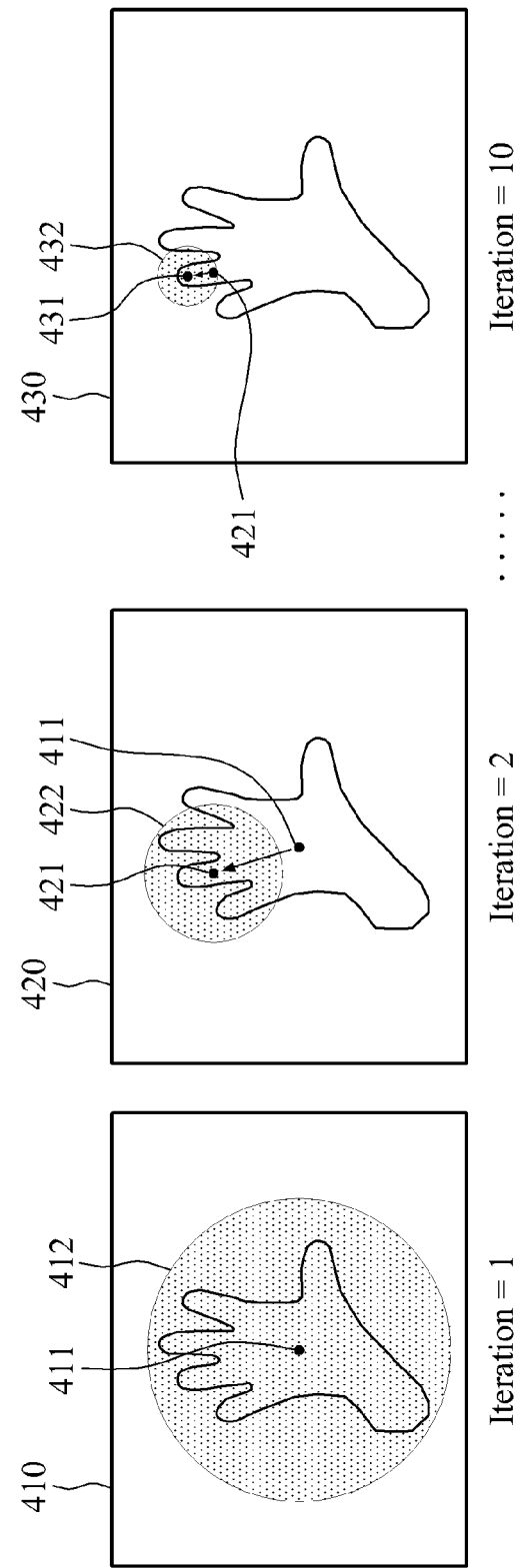
FIG. 4 illustrates a diagram of an operation of reducing an area used to compute a depth feature based on an iteration count according to example embodiments.

FIG. 4 illustrates a diagram of an operation of reducing an area used to compute a depth feature based on an iteration count according to example embodiments.

Referring to FIG. 4, parameters used to estimate a ring finger's first knuckle may be iteratively learned. As an iteration count increases, a size of an area around an estimation position corresponding to the iteration count may decrease. A size of an area corresponding to the iteration count may be expressed as shown in Equation 2 below.

$$\text{Range}(\theta_1) \geq \text{Range}(\theta_2) \geq \ldots \geq \text{Range}(\theta_k) \quad \text{[Equation 2]}$$

In Equation 2, $\theta_k$ denotes an area around an estimation position corresponding to a k-th iteration, and $\text{Range}(\theta_k)$ denotes a size of the area. The area may be a desired (or alternatively, a predetermined) area.

For example, in an image 410 corresponding to a first iteration, an estimation position 411 corresponding to the first iteration may be a center of a hand. A determined area 412 around the estimation position 411 may be large enough to cover an entire hand. In an image 420 corresponding to a second iteration, the estimation position 411 may be updated to a ring finger's first knuckle as an estimation position 421 corresponding to the second iteration. An area 422 around the estimation position 421 may be smaller than the area 412. In an image 430 corresponding to a tenth iteration, the estimation position 421 may be updated to a ring finger's tip as an estimation position 431 corresponding to the tenth iteration. An area 432 around the estimation position 431 may be smaller than the areas 412 and 422.

A number of points generated within an area around an estimation position by the depth feature computing unit 111 may remain constant regardless of a change in a size of the area. For example, the depth feature computing unit 111 may generate two hundred (200) points within an area for each of iterations such that one hundred (100) offset pairs are generated within the area. A size of an area corresponding to each of the iterations may decrease as an iteration count increases. Accordingly, offset pairs may be formed more densely around an estimation position. When the offset pairs are more densely placed around the estimation position, a depth feature may be more finely computed. According to example embodiments, a depth feature associated with an entire hand may be coarsely computed during an initial iteration, and a depth feature associated with a desired (or alternatively, a predetermined) part of the hand, for example a knuckle of a finger, may be more finely computed during each iteration. In other words, through a plurality of iterations, more fine depth features may be generated, and parameters may be learned.

FIG. 5 illustrates a diagram of an operation of learning a parameter corresponding to an iteration count according to example embodiments.

The learner 112 of FIG. 1 may generate, for each iteration, a learned parameter corresponding to the iteration based on a depth feature computed in each of the iterations. The operation of learning a parameter may be formulated as an optimization problem and solved using equation 3 below.

$$\min_{\Delta x} f(x_0 + \Delta x) = \min_{\Delta x} \|\phi(x_0 + \Delta x) - \phi_*\|_2^2 \quad \text{Eq. (3)}$$

where $\emptyset(X)$ is the extracted features at pixel x and $\emptyset^* = \emptyset(X^*)$ represents the values in the labeled landmarks.

The optimization problem expressed in equation 3 may be represented as the algorithm of equations 4 and 5, below.

Update Equation:

$$x_{k+1}^i = x_k^i + R_k \cdot \phi_k(x_k^i) + b_k \quad \text{Eq. (4)}$$

Learns average descent directions $R_k$ and bias terms $b_k$ at k-step. by:

$$\arg\min_{R_k, b_k} \sum_{i=1}^{n} \|\Delta x_*^{ki} - R_k \phi_k^i - b_k\|^2 \quad \text{Eq. (5)}$$

with $\Delta x_*^{ki} = x_*^i - x_k^i$, $\phi_k^i = \phi_k(x_k^i)$

In Equations 4 and 5, i denotes an index of a training image, k denotes an iteration count, n denotes a number of training images, $R_k$ and $b_k$ denote parameters corresponding to a k-th iteration, $x_*^i$ denotes position information of parts of an articulated object included in an i-th training image, $x_k^i$ denotes an estimation position corresponding to the k-th iteration in the i-th training image, $x_{k+1}^i$ denotes an estimation position corresponding to a (k+1)-th iteration in the i-th training image, and $\phi_k(\ )$ denotes an operator to compute a depth feature corresponding to the k-th iteration. Additionally, $\phi_k(x_k^i)$ may be computed as shown in Equation 6 below.

$$\phi_k(x_k^i) = d\left(x_k^i + \frac{u_k}{d(x_k^i)}\right) - d\left(x_k^i + \frac{v_k}{d(x_k^i)}\right) \quad \text{Eq. (6)}$$

Referring to FIG. 5, the position information $x_*^i$ may be acquired from labeled training images. The position information $x_*^i$ may be determined based on a training image, instead of varying based on an increase in an iteration count. For example, $x_*^1$ may be acquired from a first training image, and $x_*^i$ may be acquired from the i-th training image.

$x_1^i$ may be set as an initial value. For example, $x_1^1$ may be set as a central position of an object included in the first training image, and $x_1^i$ may be set as a central position of an object included in the i-th training image.

In a first iteration 510, depth features corresponding to the first iteration 510 in a plurality of training images may be computed as shown in Equation 7 below.

$$\phi_1(x_1^i) = d\left(x_1^i + \frac{u_1}{d(x_1^i)}\right) - d\left(x_1^i + \frac{v_1}{d(x_1^i)}\right) \quad \text{Eq. (7)}$$

For example, a depth feature $\phi_1^1$ corresponding to the first iteration 510 in a first training image, a depth feature $\phi_1^i$ corresponding to the first iteration 510 in an i-th training image, and the like may be computed. In Equation 7, $u_1$ and $v_1$ denotes points of each of a plurality of offset pairs generated in the first iteration 510. An offset pair of the points $u_1$ and $v_1$ may be generated in the first iteration 510, and may be equally applied to the plurality of training images.

When computation of depth features for the plurality of training images is completed, parameters $R_1$ and $b_1$ 513 may be learned so that a sum of a square of an item 511 through a square of an item 512 may be reduced (or alternatively, minimized).

In a k-th iteration 520, position information $x_k^i$ may be computed based on result values of a previous iteration. For example, $x_k^1$ may be computed by $x_k^1 = x_{k-1}^1 + R_{k-1} \cdot \phi_{k-1}(x_{k-1}^1) + b_{k-1}$, and $x_k^i$ may be computed by $x_k^i = x_{k-1}^i + R_{k-1} \cdot \phi_{k-1}(x_{k-1}^i) + b_{k-1}$.

In the k-th iteration 520, depth features corresponding to a k-th iteration in the plurality of training images may be computed as shown in Equation 8 below.

$$\phi_k(x_k^j) = d\left(x_k^j + \frac{u_k}{d(x_k^j)}\right) - d\left(x_k^j + \frac{v_k}{d(x_k^j)}\right) \qquad \text{Eq. (8)}$$

For example, a depth feature $\phi_k^1$ corresponding to the k-th iteration 520 in the first training image, a depth feature $\phi_k^i$ corresponding to the k-th iteration 520 in the i-th training image, and the like may be computed. In Equation 8, $u_k$ and $v_k$ denotes points of each of a plurality of offset pairs generated in the k-th iteration 520. As described above, an offset pair of the points $u_k$ and $v_k$ may be generated within a smaller area than an area in which in the offset pair of the points $u_1$ and $v_1$ is generated. The offset pair of the points $u_k$ and $v_k$ may be generated in the k-th iteration 520, and may be equally applied to the plurality of training images.

When computation of depth features for the plurality of training images is completed, parameters $R_k$ and $b_k$ 523 may be learned so that a sum of a square of an item 521 through a square of an item 522 may be reduced (or alternatively, minimized).

Figure 6:
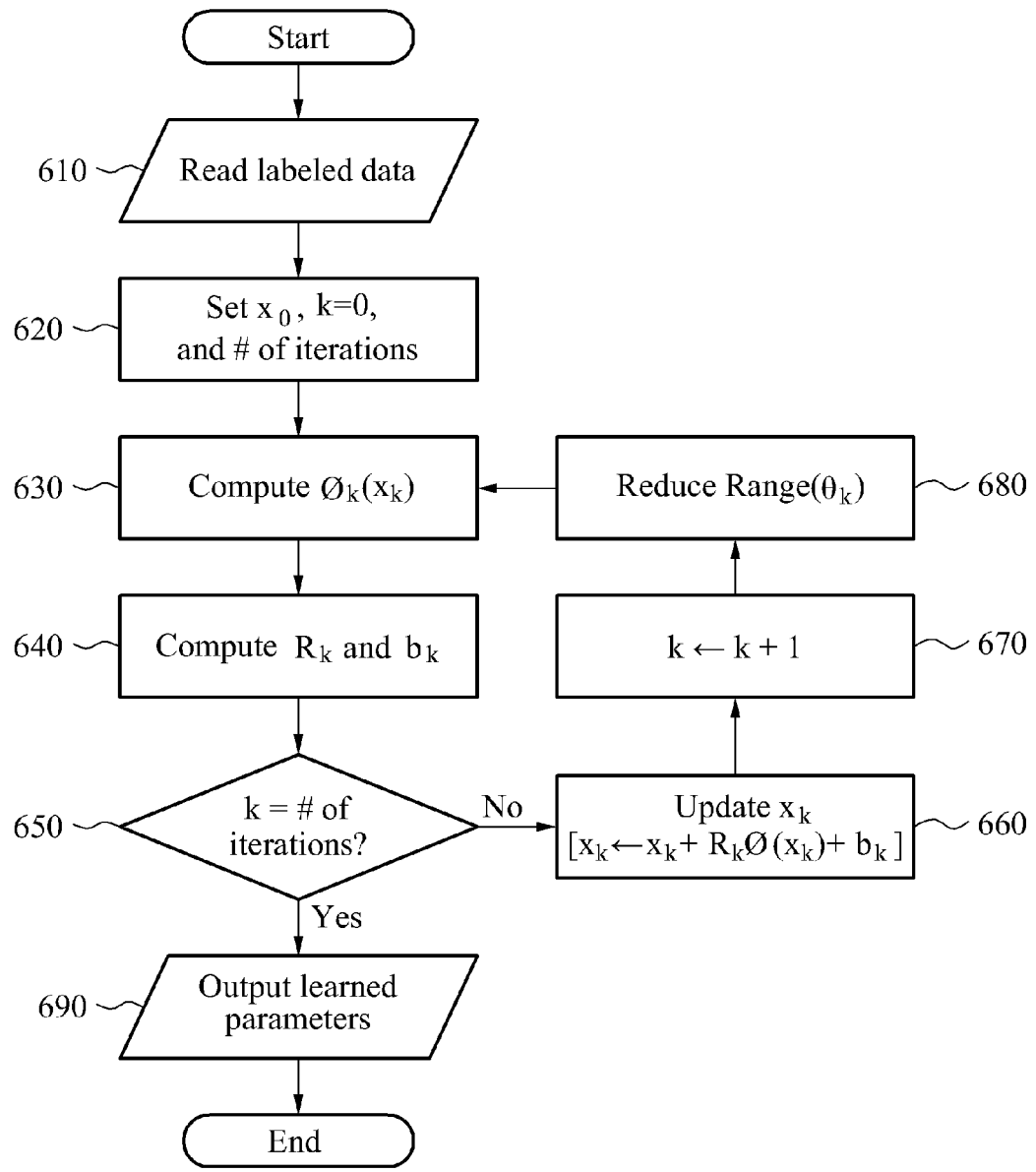
FIG. 6 illustrates a flowchart of a learning method according to example embodiments.

FIG. 6 illustrates a flowchart of a learning method according to example embodiments.

Referring to FIGS. 1 and 6, in operation 610, the learning apparatus 110 may read labeled data, for example, a labeled training image. In operation 620, the learning apparatus 110 may set an initial estimation position $x_0$, an iteration count k, and a total number (#) of iterations. In operation 630, the learning apparatus 110 may compute depth features $\emptyset_k(x_k)$ corresponding to the iteration count k. In operation 640, the learning apparatus 110 may compute parameters $R_k$ and $b_k$ corresponding to the iteration count k.

In operation 650, the learning apparatus 110 may determine whether the iteration count k reaches the total number of iterations. When the learning apparatus 110 determines that the iteration count k is less than the total number of iterations, the learning apparatus 110 may update an estimation position $x_k$ in operation 660, increment the iteration count k in operation 670, and reduce a size Range($\theta_k$) of an area in which offset pairs are generated in operation 680. When the iteration count k reaches the total number of iterations, the learning apparatus 110 may output the learned parameters corresponding to each of iterations in operation 690.

Figure 7:
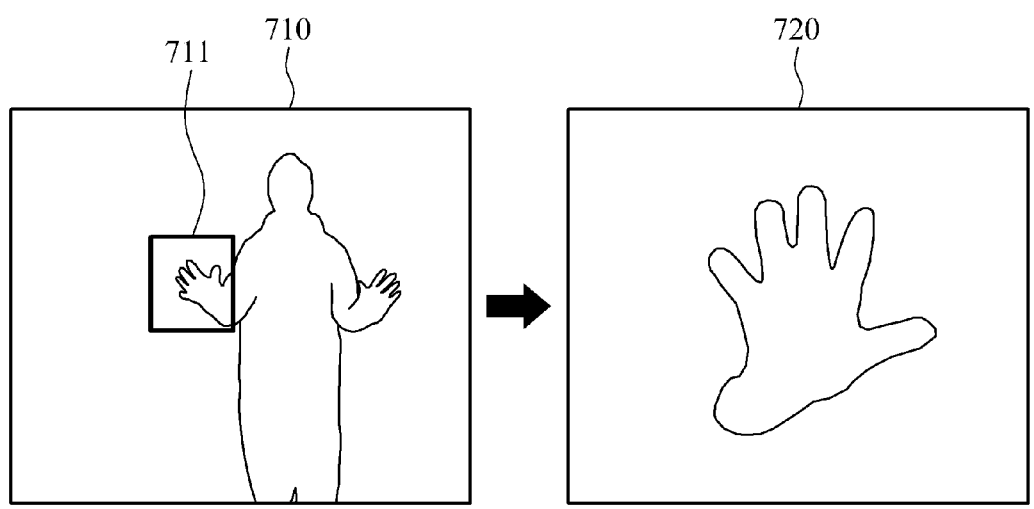
FIG. 7 illustrates a diagram of an operation of extracting an area of an articulated object from an input image according to example embodiments.

FIG. 7 illustrates a diagram of an operation of extracting an area of an articulated object from an input image according to example embodiments.

Referring to FIGS. 1 and 7, the extractor 121 of FIG. 1 may extract an area 711 of an articulated object from an input image 710. The extractor 121 may output an extracted input image 720.

FIG. 8 illustrates a diagram of an operation of iteratively estimating position information of parts of an articulated object according to example embodiments.

Referring to FIGS. 1 and 8, the depth feature computing unit 122 of FIG. 1 may compute a depth feature $\emptyset_k(x_k)$ corresponding to an iteration count x, using Equation 9, below.

$$\phi_k(x_k) = d\left(x_k + \frac{u_k}{d(x_k)}\right) - d\left(x_k + \frac{v_k}{d(x_k)}\right) \qquad \text{Eq. (9)}$$

In Equation 9, k denotes an iteration count, $x_k$ denotes an estimation position corresponding to a k-th iteration, $u_k$ and $v_k$ denote points of an offset pair that is set in the k-th iteration (e.g. in advance), d( ) denotes an operator to compute a depth, and $\phi_k$( ) denotes an operator to compute a depth feature corresponding to the k-th iteration. An offset pair of the points $u_k$ and $v_k$ may be generated in the k-th iteration by the depth feature computing unit 111 of FIG. 1.

The estimator 123 of FIG. 1 may compute the estimation position $x_k$ corresponding to the iteration count k, using Equation 10, below.

$$x_{k+1} = x_k + R_k \cdot \phi_k(x_k) + b_k \qquad \text{Eq. (10)}$$

In Equation 10, k denotes an iteration count, $x_k$ denotes an estimation position corresponding to a k-th iteration, $R_k$ and $b_k$ denote parameters that are learned in advance in the k-th iteration, $\phi_k$( ) denotes an operator to compute a depth feature corresponding to the k-th iteration, and $x_{k+1}$ denotes an estimation position corresponding to a (k+1)-th iteration.

The depth feature computing unit 122 may compute an initial estimation position $x_1$ 811 from an input image 810. The depth feature computing unit 122 may substitute the initial estimation position $x_1$ 811 and an offset pair of points $u_1$ and $v_1$ corresponding to a first iteration into Equation 9, and may compute a depth feature $\phi_1(x_1)$ corresponding to the first iteration. A plurality of offset pairs of points $u_1$ and $v_1$ may be generated in the first iteration by the depth feature computing unit 111.

Additionally, the estimator 123 may substitute the initial estimation position $x_1$ 811, the depth feature $\phi_1(x_1)$, and parameters $R_1$ and $b_1$ corresponding to the first iteration into Equation 10, and may compute estimation positions $x_2$ 821, 822, 823, 824, and 825 corresponding to a second iteration.

The depth feature computing unit 122 and the estimator 123 may update estimation positions through a plurality of iterations. For example, the estimator 123 may compute estimation positions $x_{10}$ 831, 832, 833, 834, and 835 corresponding to a tenth iteration. The estimator 123 may output final estimation positions.

Figure 9:
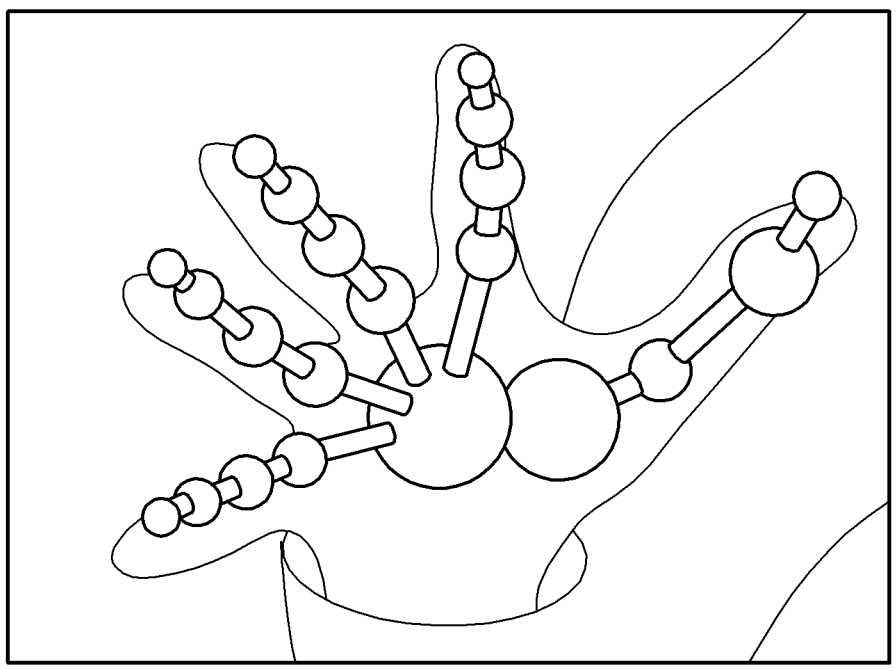
FIG. 9 illustrates a diagram of a visualized posture of an articulated object according to example embodiments.

FIG. 9 illustrates a diagram of a visualized posture of an articulated object according to example embodiments.

Referring to FIG. 9, parts of an articulated object may be visualized based on an estimation result. For example, the estimator 123 of FIG. 1 may estimate position information of parts of an articulated object in an input image, and may output an estimation result. The estimator 123 may visualize the parts of the articulated object based on the estimated position information. The estimator 123 may estimate a posture of the articulated object based on the estimated position information.

Figure 10:
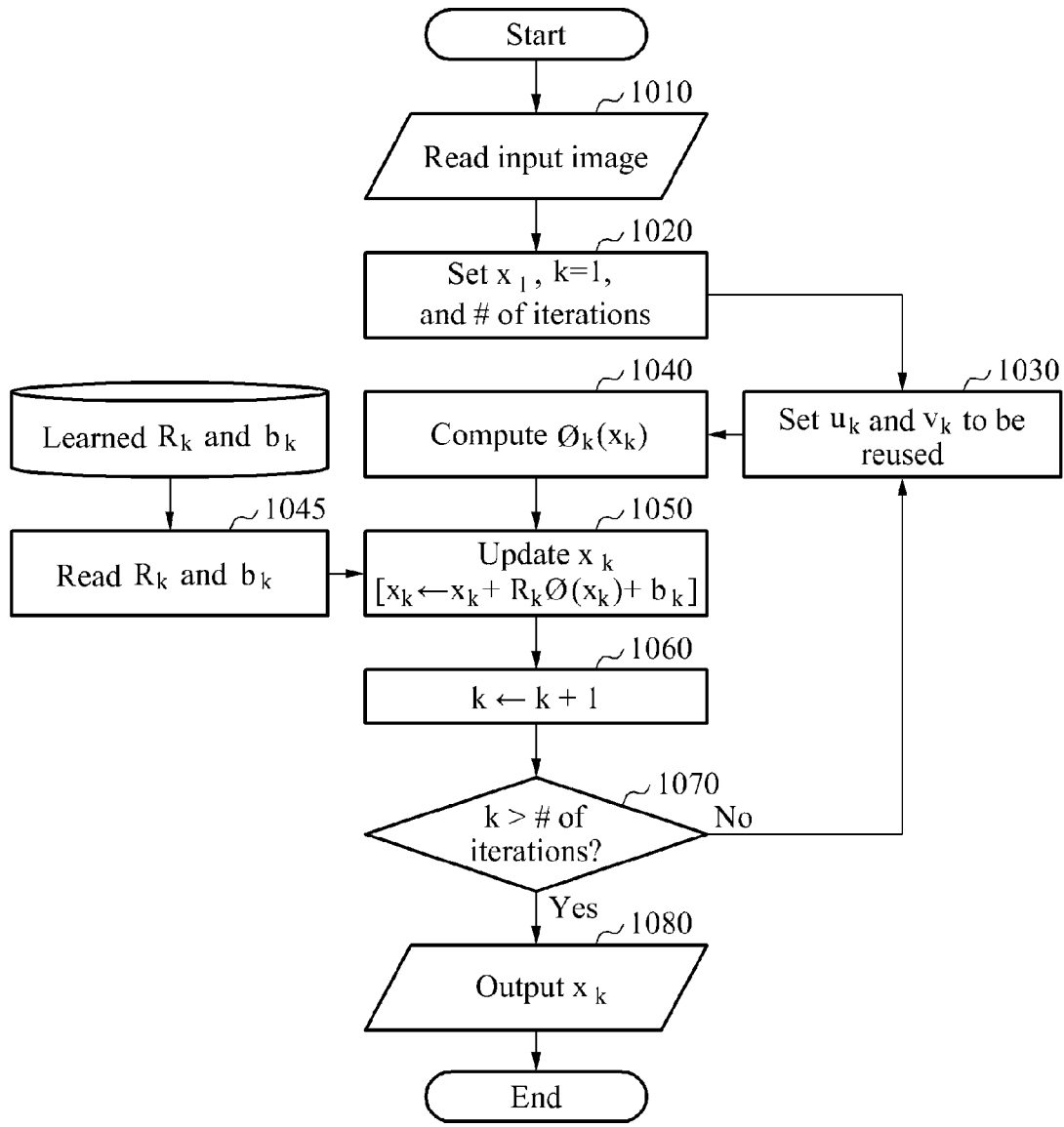
FIG. 10 illustrates a flowchart of an estimation method according to example embodiments.

FIG. 10 illustrates a flowchart of an estimation method according to example embodiments.

Referring to FIGS. 1 and 10, in operation 1010, the estimation apparatus 120 may read an input image, for example, the extractor 121 may extract an image of a hand. In operation 1020, the depth feature computing unit 122 of the estimation apparatus 120 may set an initial estimation position $x_1$, an iteration count k, and a total number (#) of iterations. In operation 1030, the estimation apparatus 120 may access an offset pair of points $u_k$ and $v_k$ generated during learning. In operation 1040, the depth feature computing unit 122 may compute depth features $\emptyset_k(x_k)$, for example, based on equation 9. In operation 1045, the estimator 123 may read the learned parameters $R_k$, and $b_k$. In operation 1050, the estimator may update an estimation position $x_k$, for example based on equation 10. In operation 1060, the estimation apparatus 120 may increment the iteration count k. In operation 1070, the estimation apparatus 120 may determine whether the iteration count k exceeds the total number of iterations.

When the estimation apparatus 120 determines that the iteration count k is less than or equal to total number of iterations, the estimation apparatus 120 may iteratively perform operations 1030 through 1070. When the estimation apparatus 120 determines that the iteration count k exceeds the total number of iterations, the estimator 123 may output a final estimation position $x_k$ in operation 1080.

Figure 11:
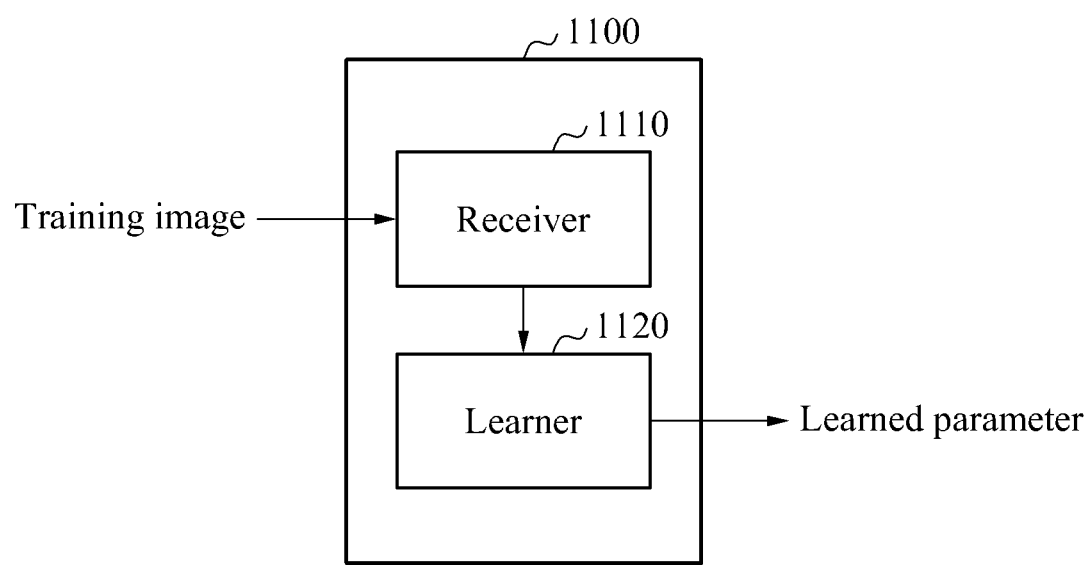
FIG. 11 illustrates a block diagram of a learning apparatus according to example embodiments.

FIG. 11 illustrates a block diagram of a learning apparatus 1100 according to example embodiments.

Referring to FIG. 11, the learning apparatus 1100 may include a receiver 1110, and a learner 1120. The receiver 1110 may receive a training image including an articulated object. The learner 1120 may iteratively learn a parameter used to estimate a posture of the articulated object, based on an estimation position corresponding to an iteration count and a depth feature corresponding to the estimation position. For example, the learner 1120 may include the depth feature computing unit 111 and the learner 112 of FIG. 1.

Figure 12:
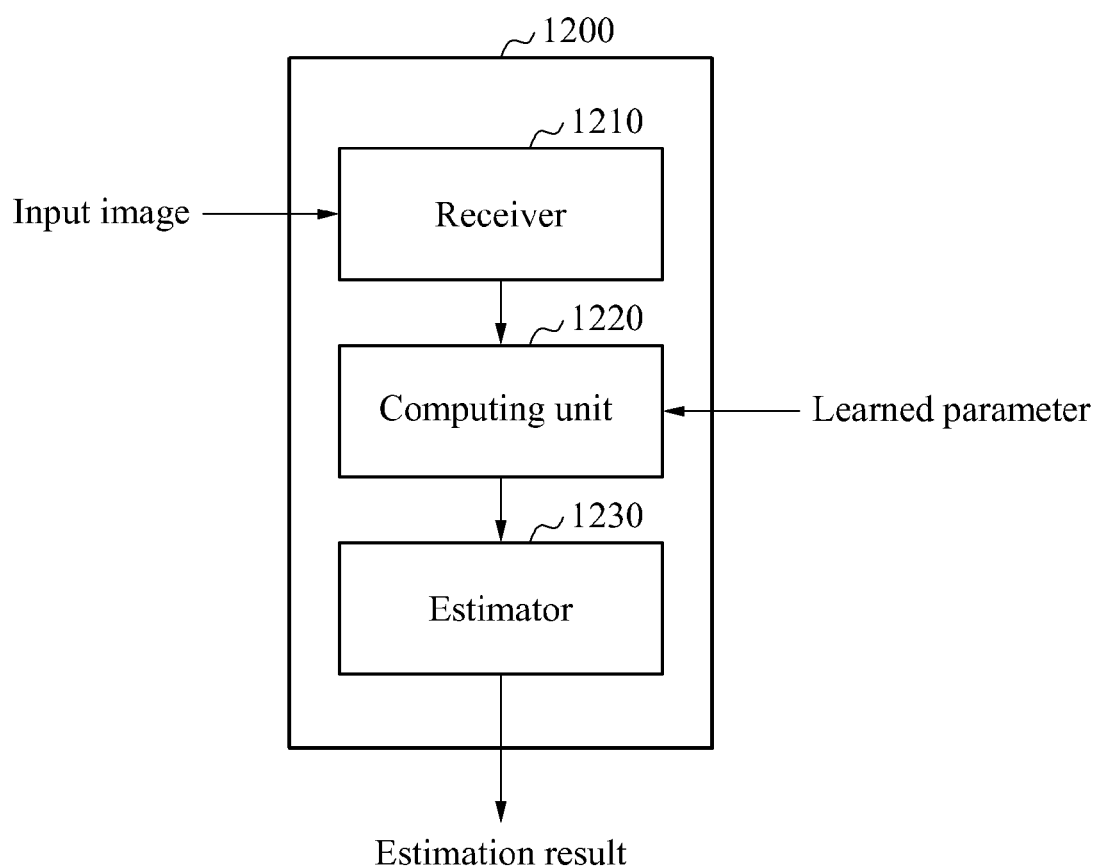
FIG. 12 illustrates a block diagram of an estimation apparatus according to example embodiments.

FIG. 12 illustrates a block diagram of an estimation apparatus 1200 according to example embodiments.

Referring to FIG. 12, the estimation apparatus 1200 may include a receiver 1210, a computing unit 1220, and an estimator 1230.

The receiver 1210 may receive an input image including an articulated object. The computing unit 1220 may repeatedly compute position information of parts of the articulated object based on an estimation position corresponding to an iteration count, a depth feature corresponding to the estimation position, and a parameter corresponding to the iteration count, for example, a parameter that is learned in advance. The estimator 1230 may estimate a posture of the articulated object based on the position information. For example, the computing unit 1220 may include the depth feature computing unit 122 and the estimator 123 of FIG. 1.

The units described herein may be implemented using hardware components and software components. For example, the units included in the learning apparatus 110 and the estimation apparatus 120 may be implemented using hardware components. The hardware components may include microphones, amplifiers, band-pass filters, audio to digital convertors, and processing devices.

The processing device may be implemented as a processor, a controller and an arithmetic logic unit, a digital signal processor, a microcomputer, a field programmable array, a programmable logic unit, a microprocessor or any other device capable of responding to and executing instructions in a defined manner such that the processing device is programmed with instructions that configure the processing device as a special purpose computer configured to perform the methods illustrated in FIGS. 6 and 10.

The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, non-transitory computer storage medium or device capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A learning method, comprising:
    iteratively learning a parameter based on an estimation position and a depth feature corresponding to the estimation position, the parameter being used to estimate a posture of an articulated object in a training image and the estimation position corresponding to an iteration count, wherein
        the iteratively learning includes computing the estimation position based on an estimation position corresponding to a previous iteration count, a depth feature corresponding to the previous iteration count, and a parameter corresponding to the previous iteration count.

2. The learning method of claim 1, wherein the training image includes position information of parts of the articulated object.

3. The learning method of claim 2, wherein the iteratively learning comprises:

computing the depth feature based on the estimation position; and computing the parameter based on the position information, the estimation position, and the depth feature.

4. The learning method of claim 2, wherein
the iteratively learning includes generating a plurality of offset pairs within an area around the estimation position, and the computing the depth feature computes the depth feature based on the offset pairs.

5. The learning method of claim 4, wherein as the iteration count increases, a size of the area decreases.

6. The learning method of claim 4, further comprising:
first storing the parameter learned in each iteration count.

7. The learning method of claim 6, further comprising:
second storing a plurality of offset pairs generated within an area around the estimation position, and computing the depth feature based on the offset pairs.

8. The learning method of claim 1, wherein the iteratively learning comprises:
computing the estimation position X based on $$x_{k+1} = x_k + R_k \cdot \phi_k(x_k) + b_k$$

wherein k denotes an iteration count, $x_k$ denotes the estimation position corresponding to a k-th iteration, $R_k$ and $b_k$ denote parameters corresponding to the k-th iteration, $\phi_k(\ )$ denotes an operator to compute the depth feature corresponding to the k-th iteration, and $x_{k+1}$ denotes the estimation position corresponding to a (k+1)-th iteration.

9. The learning method of claim 1, wherein the iteratively learning comprises:
computing the depth feature based on $$\phi_k(x_k) = d\left(x_k + \frac{u_k}{d(x_k)}\right) - d\left(x_k + \frac{v_k}{d(x_k)}\right)$$

wherein k denotes the iteration count, $x_k$ denotes the estimation position corresponding to a k-th iteration, $u_k$ and $v_k$ denote points of an offset pair corresponding to the k-th iteration, $d(\ )$ denotes an operator to compute a depth, and $\phi_k(\ )$ denotes an operator to compute the depth feature corresponding to the k-th iteration.

10. The learning method of claim 1, wherein the iteratively learning comprises:
computing the parameter based on $$\arg\min_{R_k, b_k} \sum_{i=1}^{n} \|\Delta x_*^{ki} - R_k \phi_k^i - b_k\|^2$$

with $\Delta x_*^{ki} = x_*^i - x_k^i$, $\phi_k^i = \phi_k(x_k^i)$ wherein i denotes an index of the training image, k denotes the iteration count, n denotes a number of the training images, $R_k$ and $b_k$ denote parameters corresponding to the k-th iteration, $x_*^i$ denotes position information of parts of the articulated object included in an i-th training image, $x_k^i$ denotes the estimation position corresponding to the k-th iteration in the i-th training image, and $\phi_{k(\ )}$ denotes an operator to compute the depth feature corresponding to the k-th iteration.

11. An estimation method, comprising:
iteratively estimating position information of parts of an articulated object included in an input image based on an estimation position corresponding to an iteration count, a depth feature corresponding to the estimation position, and a parameter corresponding to the iteration count, wherein the iteratively estimating includes computing the estimation position based on an estimation position corresponding to a previous iteration count, a depth feature corresponding to the previous iteration count, and a parameter corresponding to the previous iteration count.

12. The estimation method of claim 11, further comprising:
estimating a posture of the articulated object based on the position information.

13. The estimation method of claim 11, wherein the iteratively estimating comprises:
computing the depth feature based on offset pairs, the offset pairs indicating offset positions that are based on the estimation position.

14. The estimation method of claim 13, wherein the offset positions are distributed closer to the estimation position, as the iteration count increases.

15. The estimation method of claim 11, further comprising:
first receiving parameters associated with each iteration count that are determined prior to the associated iteration count.

16. The estimation method of claim 15, further comprising:
second receiving offset pairs, the offset pairs indicating offset positions that are based on the estimation position.

17. The estimation method of claim 11, wherein the iteratively estimating comprises:
computing the estimation position x based on $$x_{k+1} = x_k + R_k \cdot \phi_k(x_k) + b_k$$

wherein k denotes the iteration count, $x_k$ denotes the estimation position corresponding to a k-th iteration, $R_k$ and $b_k$ denote parameters corresponding to the k-th iteration, $\phi_k(\ )$ denotes an operator to compute the depth feature corresponding to the k-th iteration, and $x_{k+1}$ denotes the estimation position corresponding to a (k+1)-th iteration.

18. The estimation method of claim 11, wherein the iteratively estimating comprises:
computing the depth feature based on $$\phi_k(x_k) = d\left(x_k + \frac{u_k}{d(x_k)}\right) - d\left(x_k + \frac{v_k}{d(x_k)}\right)$$

wherein k denotes the iteration count, $x_k$ denotes the estimation position corresponding to a k-th iteration, $u_k$ and $v_k$ denote points of an offset pair corresponding to the k-th iteration, $d(\ )$ denotes an operator to compute a depth, and $\phi_k(\ )$ denotes an operator to compute the depth feature corresponding to the k-th iteration.

* * * * *